United States Patent Office 3,321,675
Patented May 23, 1967

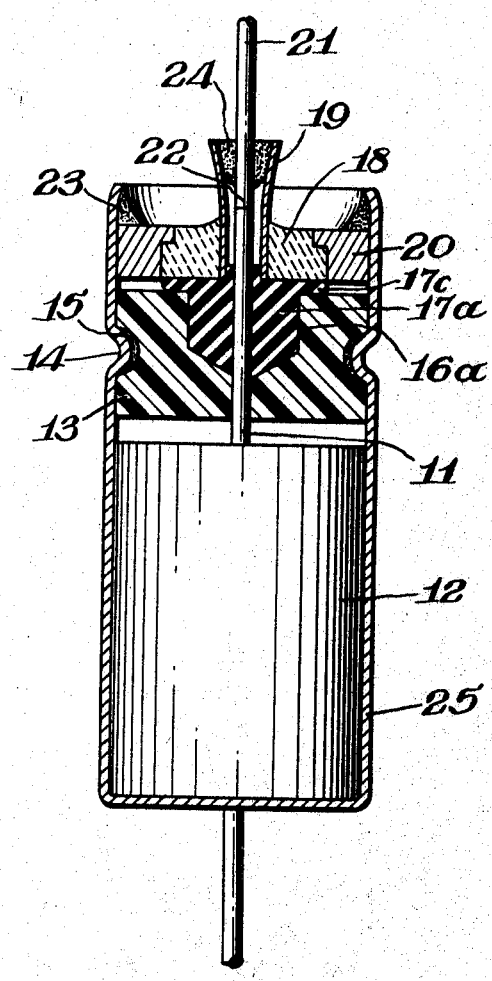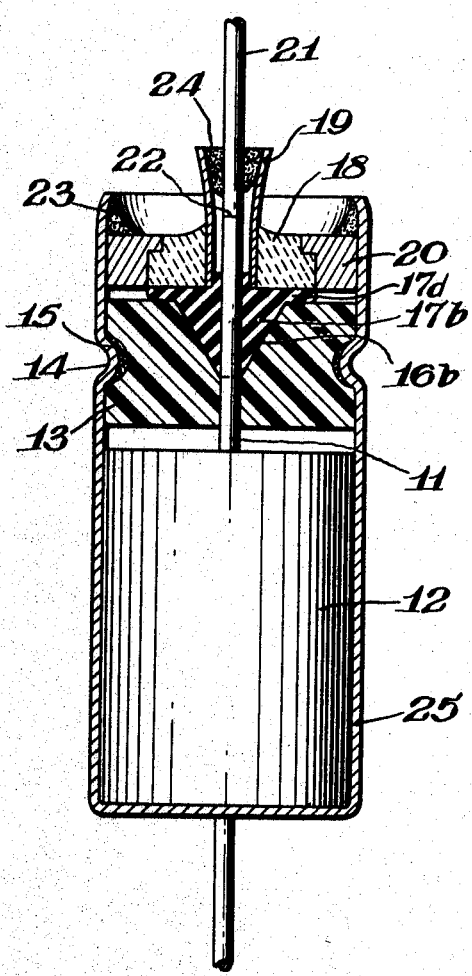

3,321,675
ELECTROLYTIC CAPACITOR COMPRISING GLASS-TO-METAL AND RESILIENT PRESSURE SEAL COMBINATION
George W. Diggens, North Adams, Mass., assignor to Sprague Electric Company, North Adams, Mass., a corporation of Massachusetts
Filed Apr. 14, 1964, Ser. No. 359,745
4 Claims. (Cl. 317—230)

ABSTRACT OF THE DISCLOSURE

An electrolytic capacitor having a resilient member compressed within a recess of a circumferentially grooved insulating member. Both members are positioned about the lead wire of the capacitor anode. A glass-to-metal seal compresses the resilient member into said recess and a protuberant portion of said resilient member presses against the eyelet of said glass-to-metal seal.

---

This invention relates to electrolytic capacitors and more particularly to end-seal constructions for electrolytic capacitors.

Electrolytic capacitor assemblies generally comprise a container, such as a can, housing a capacitor section. The container, fitted with some type of end-seal, serves to retain the electrolyte necessary for operation of the capacitor. The electrolyte is usually a liquid or a paste and often of a corrosive nature. Prior art end-seals have not been successful in coping with the problem of electrolyte creepage. This creepage occurs along the boundaries of the different materials employed as the sealing means.

The use of a glass-to-metal seal in conjunction with a more or less conventional secondary internal seal does not solve the problem. Glass-to-metal seals are constructed of a central tubular metal eyelet, into which part way extends the capacitor section lead or riser-wire; a mass of glass surrounds and is fused to said metal eyelet and about this mass of glass is a metal ring or washer to which the glass is fused. In a tantalum capacitor the internal lead or riser wire is also tantalum and it is butt-welded to a solderable wire. The point of butt-weld is located about midway within the metal eyelet and held in place by solder. The secondary internal seal is generally a plug of suitable material which is positioned about the riser-wire and held in place by an internal beading formed in the capacitor case.

The electrolyte has a tendency to creep along the interface of the periphery of the secondary seal and the can wall. It then travel across the glass face of the glass-to-metal seal to the area of the metal eyelet. Here an electrolyte bridge is formed between the capacitor case wall and either eyelet, the point of butt-weld, or both. This bridge results in a large increase in the leakage current which, in a short period of time, leads to electrical failure of the capacitor. The same result occurs when electrolyte creeps along the internal lead wire to the area of the metal eyelet.

A further disadvantage of this seal, as the sole seal, is galvanic corrosion which takes place between the different metals within the eyelet and also between the different metals at the point where the glass-to-metal seal is soldered to the can wall. This corrosive action eventually will destroy the solder seal permitting loss of electrolyte. Current emphasis is on extremely small components, hence, in miniature and sub-miniature capacitors the loss of even a minute amount of electrolyte cannot be tolerated. The problem of electrolyte creepage is aggravated by present day requirements which call for operating at extremely high temperatures, for example, 100–200° C.

It is an object of this invention to overcome the foregoing and related disadvantages.

It is another object to provide a hermetically sealed capacitor.

Another object is to provide a capacitor having a seal capable of withstanding internal pressure without breaking.

Still another object is to provide an electrolytic capacitor having a seal designed to stop electrolyte creepage, thus preventing its contacting the interface of the different metals making up the capacitor.

These and other objects will become apparent from the description of the invention when read in conjunction with the accompanying drawing, wherein:

FIGURES 1 and 2 show two variations of the subject end-seal assemblies via side views in section.

Broadly stated the invention is concerned with an electrolytic capacitor having an inner and outer seal. The capacitor comprises, a metal capacitor case housing an anodized valve-metal anode having an attached anodized valve-metal lead-wire. A suitable electrolyte is in association with the anodic oxide layer. The outer seal, which is common to the two variations shown in FIGURES 1 and 2, is similar in construction to the glass-to-metal seal referred to above. The inner seal is made up of two members. The first is a circumferentially grooved rigid member, positioned about the lead-wire and abutting the anode. This member is held in place by engaging the groove with an internal beading of the wall of said case. A centrally located recess extends inwardly from the non-anode facing side of the grooved member. The second is a resilient member positioned about said lead-wire. This resilient member is compressed within and generally takes the shape of said centrally located recess. A protuberant portion of said resilient member extends beyond said recess. The glass-to-metal seal is positioned so as to compress said resilient member into said recess. The glass-to-metal seal deforms said protuberant portion so that it presses against the eyelet of said glass-to-metal seal. This seal comprises a mass of glass surrounding and fused to a tubular metal eyelet and surrounded by and fused to a metal washer. The washer is soldered at its periphery to the case wall. A solderable lead-wire is butt-welded to the valve-metal lead-wire at a point about midway within said tubular metal eyelet and held in place by solder.

The features and details of the construction shown in FIGURE 1 and the process by which it was formed are as follows: An anodized tantalum lead-wire 11 is affixed to a tantalum foil section 12. The lead-wire is forced through a circumferentially grooved Teflon (polytetrafluoroethylene) member 13. This member is held in place by an internal beading 14 formed in capacitor case 25 and which engages the circumferential groove. To insure a firm seal a suitable caulking or adhesive material 15 may be inserted in said groove. A centrally located recess 16a extends inwardly from the non-anode facing side of the grooved member 13. A resilient member 17a is positioned about said lead-wire and compressed within and generally taking the shape of recess 16a. The resilient member 17a is compressed by means of a standard glass-to-metal seal which is inserted into the end of the case and pressed firmly against member 17a. A protuberant portion 17c of said resilient member extends beyond recess 16a and is deformed and presses against eyelet 19 of said glass-to-metal seal. The glass-to-metal seal is composed of a mass of glass 18 surrounding and fused to a tubular metal eyelet 19 and surrounded by and fused to a metal washer 20. Lead-wire 11, having been previously butt-welded to a nickel wire 21, extends into eyelet 19 so that the weld, shown at 22, is about mid-way within the eyelet. The end of the casing is spun-in slightly to temporarily hold the seals in position and facilitate handling of the unit. While the glass-to-metal seal is firmly forced against the resilient member 17a, washer 20 is soldered to the wall of the case as shown at 23. The butt-welded lead is then held in place by solder 24.

The Teflon seal at 14 and 15 and the compressed resilient member 17a makes it virtually impossible for the electrolyte to creep past these points to the glass-to-metal seal. This construction constitutes the preferred double seal of the invention.

While the shape of recess 16a is shown to be roughly that of a cylinder having a funnel-shaped base, and though this may be the preferred shape, it is to be understood that any shape which will maintain or increase the radial compression of the resilient member on the lead-wire 11 and simultaneously mask the eyelet 19 from any electrolyte leakage is contemplated. For example, FIGURE 2 shows recess 16b and resilient member 17b as roughly cone- or funnel-shaped. A protuberant portion 17d of resilient member 17b extends beyond recess 16b and is deformed and presses against eyelet 19 of said glass-to-metal seal.

The resilient member 17a or 17b should in its relaxed state be generally spheroid or of a shape which roughly corresponds with the internal surfaces of the recess. This member should also be slightly oversized so as to offer the proper resistance to compression within the recess and thereby effect a tight seal about the lead-wire and against the eyelet.

The metal employed for the capacitor case or tube can be any of the metals conventionally used for this purpose, preferably silver. While a variety of metals may be employed in the glass-to-metal seal, tin coated steel is preferred. Any rigid inert resin or plastic may be employed as the circumferentially grooved member, however, polytetrafluoroethylene is preferred. The resilient member may be of any tough, rubber-like material, which is inert to the electrolyte employed. A high molecular weight copolymer of ethylene and propylene, or butyl rubber are examples of suitable materials. The glass-to-metal seal may be of the compression type or one wherein the parts of the seal have a more or less matched coefficient of thermal expansion. The solderable wire may be any such metal, e.g., nickel, etc. The caulking or adhesive material 15 may be polybutadiene, polyisobutylene, etc. and should have a viscosity within from 50 to 100,000 cps.

The capacitor assembly may be any of the well known types, such as a convolutely wound foil section, as well as the sintered pellet and etched or plain anode wire constructions. The anode material and the lead-wire attached thereto is of a valve-metal, such as tantalum, aluminum, zirconium, niobium, etc.

As is evident from the foregoing, the invention is not to be limited to the rather specific illustrative device. Modifications and variations, as well as the substitution of equivalents may be made without departing from the spirit of the invention as defined in the appended claims.

What is claimed is:

1. A sealed electrolytic capacitor comprising a metal capacitor case containing an anodized valve-metal anode with attached anodized valve-metal lead-wire and an electrolyte; a circumferentially grooved rigid insulating member positioned about said lead wire at a point adjacent said anode, said insulating member being held in place by engagement of the groove with an internal beading of the wall of said case, said insulating member having a centrally located recess extending inwardly from the non-anode facing side thereof; a resilient member, slightly oversized with respect to said recess, positioned about said lead-wire and compressed within said recess so as to take the shape thereof, a protuberant portion of said resilient member extending beyond said recess; a glass-to-metal seal comprising a mass of glass surrounding and fused to a tubular metal eyelet and surrounded by and fused to a metal washer, said seal being positioned so as compress said resilient member into said recess thereby effecting a tight seal about said lead wire, said seal deforming said protuberant portion thereby effecting a tight seal against the eyelet of said seal; said glass-to-metal seal being soldered at its periphery to the case wall.

2. The capacitor of claim 1 wherein said recess has the general shape of a cylinder having a funnel-like base.

3. The capacitor of claim 1 wherein said recess has the general shape of a funnel.

4. The capacitor of claim 1 wherein a caulking material is positioned in said circumferential groove.

References Cited by the Examiner

UNITED STATES PATENTS

| | | | |
|---|---|---|---|
| 2,825,855 | 3/1958 | Frekko | 317—230 |
| 3,056,072 | 9/1962 | Schroeder | 317—230 |
| 3,131,337 | 4/1964 | Clement | 317—230 |
| 3,248,613 | 4/1966 | Griffin | 317—230 |

JAMES D. KALLAM, *Primary Examiner.*